Oct. 13, 1936.   W. H. LOLLEY ET AL   2,057,103
VALVE
Filed Aug. 18, 1932   4 Sheets-Sheet 2
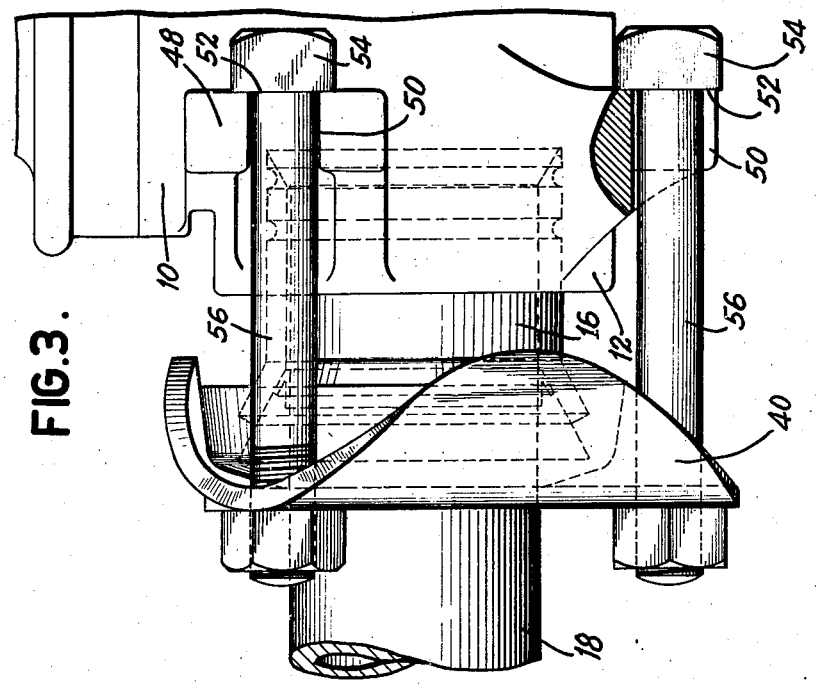
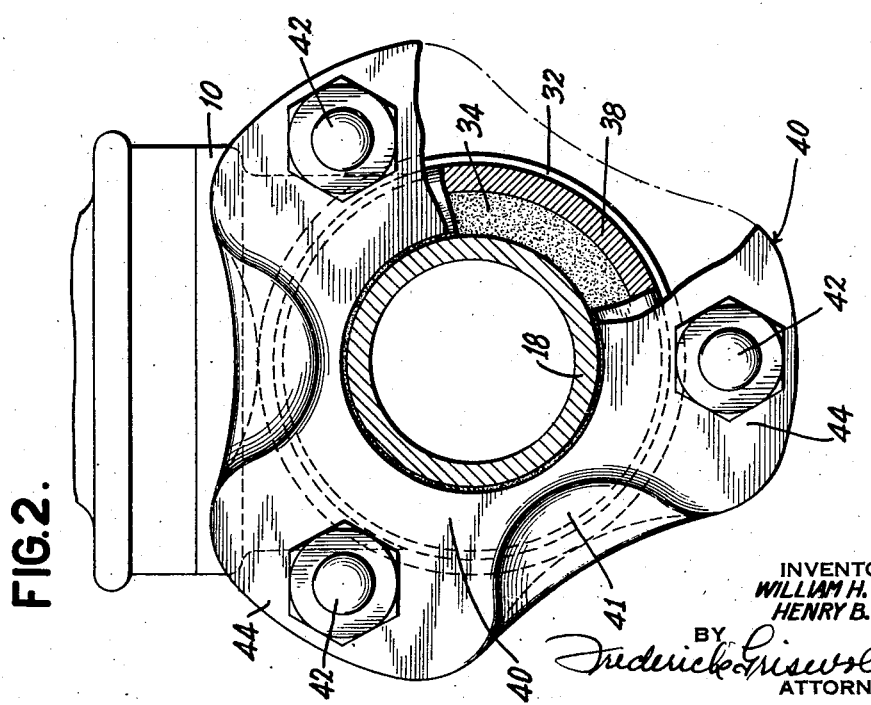
INVENTORS
WILLIAM H. LOLLEY
HENRY B. LEE
BY
Frederick Griswold Jr.
ATTORNEY

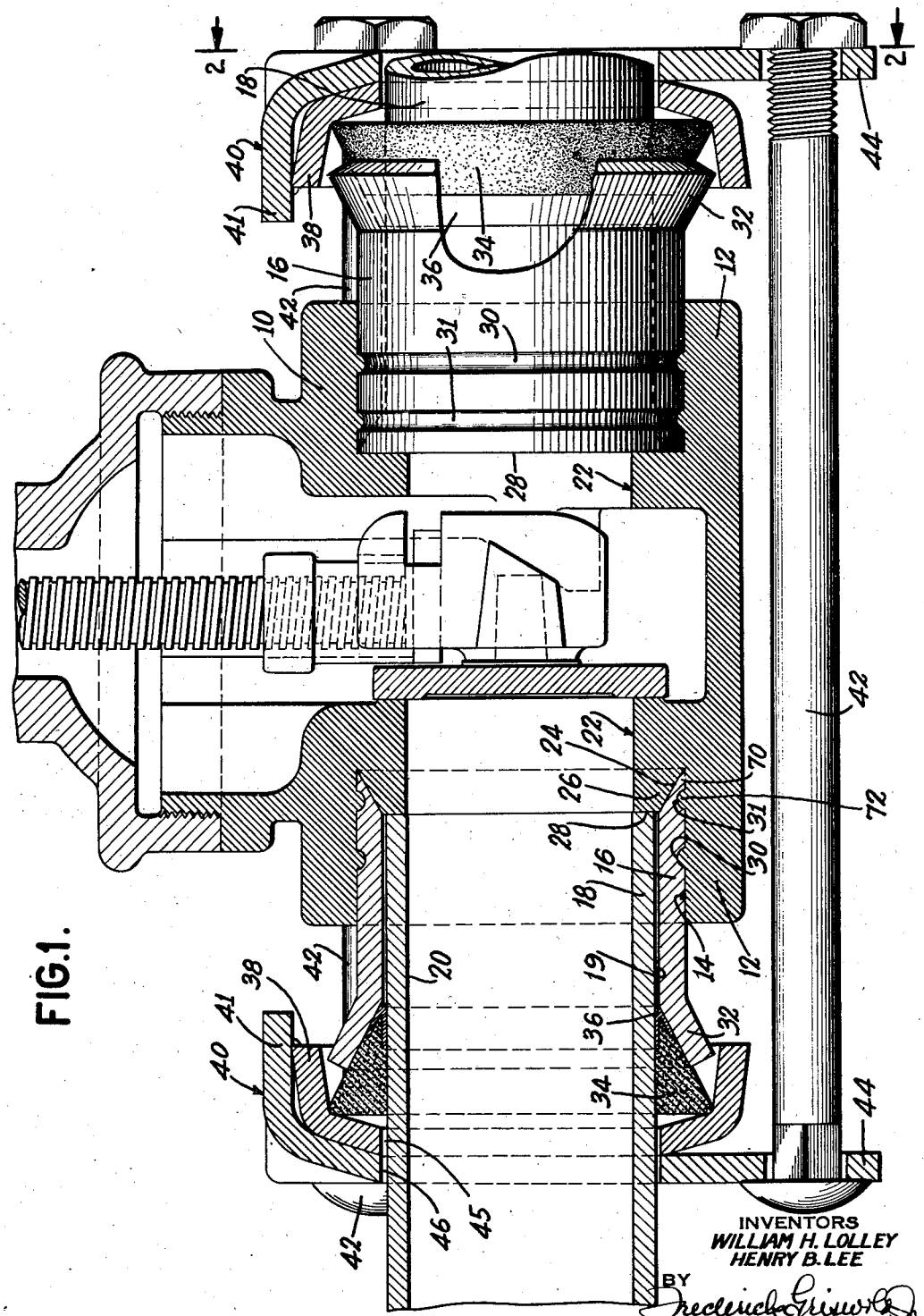

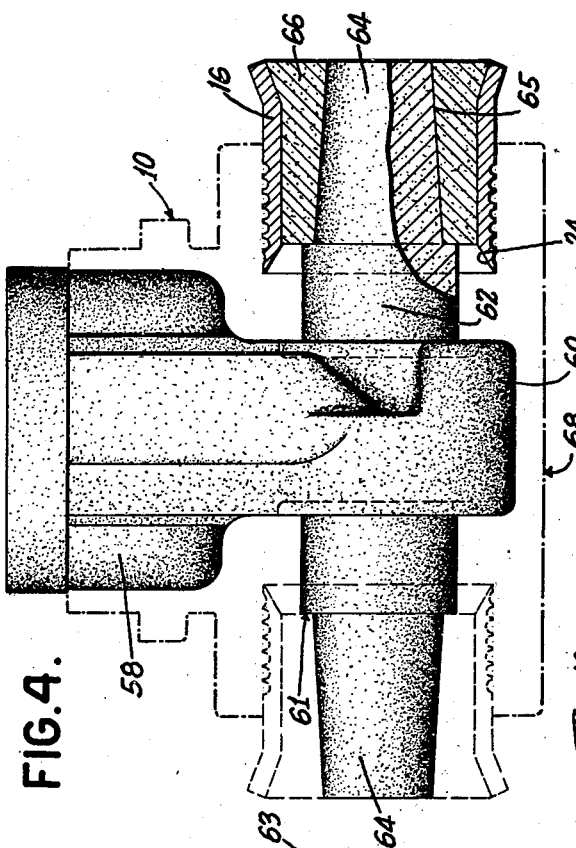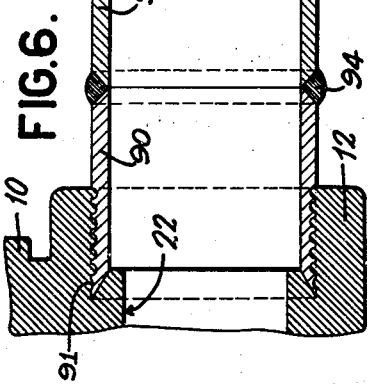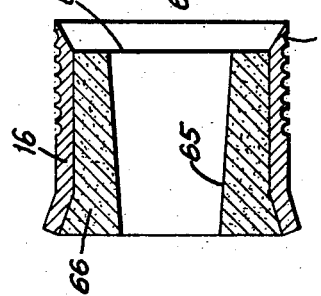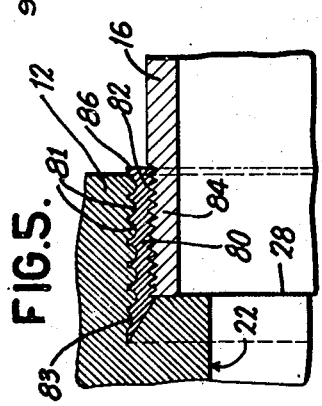

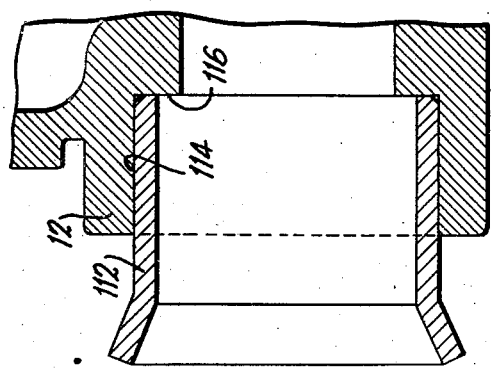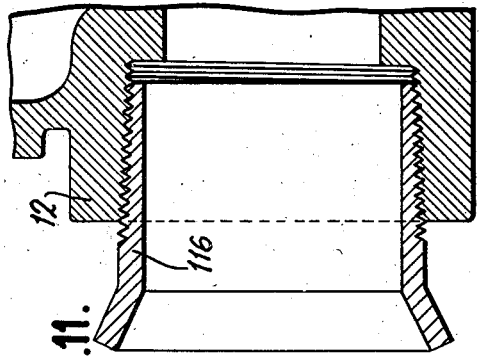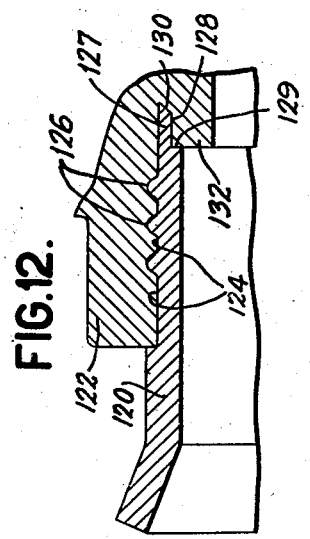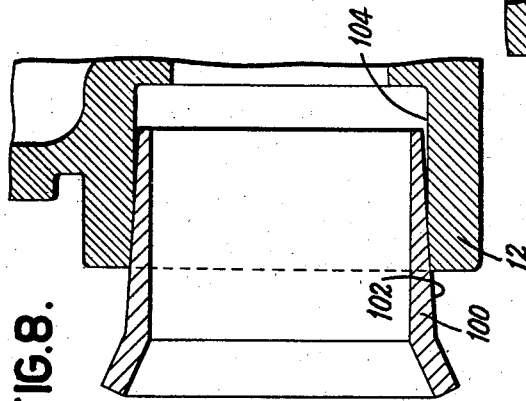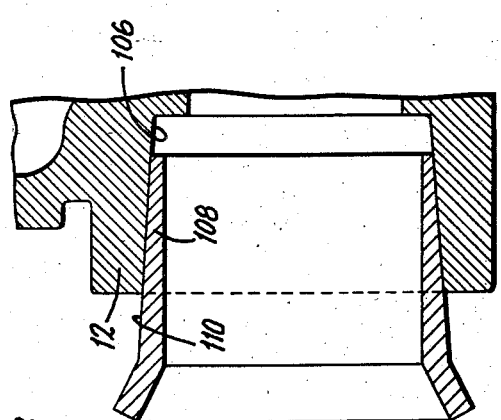

Patented Oct. 13, 1936

2,057,103

UNITED STATES PATENT OFFICE 2,057,103

VALVE

William H. Lolley, Albany, and Henry B. Lee, Troy, N. Y., assignors to The Ludlow Valve Manufacturing Company, Troy, N. Y., a corporation of New Jersey Application August 18, 1932, Serial No. 629,279

2 Claims. (Cl. 22—203)

This invention relates broadly to pipe fittings and more particularly to the connection between a fitting and the ends of the pipe between which the fitting is inserted. The invention also resides in the method of securing a nipple in a cast metal fluidway. The invention will doubtless find its broadest field of usefulness in connection with valves.

One object of the present invention is to provide a flexible joint or connection between a pipe end and a fitting which will accommodate itself, for instance, to expansion and contraction in the pipe line or other relative movement between the pipe and fitting, without applying stresses to a part of the fitting incapable of withstanding them.

Another object of the invention is to provide a tight joint or connection between the pipe end and the fitting irrespective of relative movement therebetween or the relative angle, within limits.

It is also an object of the invention to provide a connection or coupling between a plain pipe end and a valve thereby avoiding the cost of flanges and the labor and additional fittings involved particularly where, say, a length of steel pipe is to be coupled with a cast metal valve.

The invention has for a further object to provide a connection which shall do away with threaded connections or the like, subject to deterioration and rust rendering the fitting likely to leak.

In carrying the invention into effect, in the illustrated embodiment, a cylindrical nipple, of an interior diameter to receive the pipe end, is inserted into the end of a plain, cylindrical fluidway. This nipple has a flaring end and a gasket way is then compressed between the pipe and the flaring nipple end by a follower bearing thereagainst, with, if desired, a gland between the gasket and the follower, the follower being drawn up against the gasket by suitable bolts or the like.

In one of its aspects, the invention seeks a fluid tight joint between the nipple and the fitting body. To this end, the nipple may be cast into the body or fused therein or pressed therein or threaded and screwed thereinto.

These and other objects of the invention and the means for their attainment will be more apparent from the following detailed description, taken in connection with the accompanying drawings illustrating various embodiments by which the invention may be realized, and in which:

Figure 1 is a view in transverse vertical section through a valve to which the invention is applied and in which the nipples are cast, molded and/or fused in the fluidways.

Figure 2 is an end view of the valve of Figure 1 looking from the right of that figure.

Figure 3 is a view in side elevation of one end of a modified connection.

Figure 4 is a view showing a core about which the valve, and in which the nipple members are cast, and the manner in which they are positioned.

Figure 5 is a fragmentary sectional view showing a modified form of the invention in which an interiorly threaded nipple is secured in the uidway section during formation thereof and with a pipe end threaded in the nipple.

Figure 6 is a fragmentary sectional view showing still another modification in which a pipe section is welded to the protruding end of a nipple which nipple has been secured in the fluidway.

Figure 7 is a fragmentary view, in section, showing still another form taken by the nipple to insure a tight and secure joint with the cast metal body.

Figure 8 is a view showing another modified form of the invention in which a tapered nipple is pressed or forced into the cylindrical bore of a fluidway.

Figure 9 shows another modification in which a tapered nipple is pressed or forced into the tapered bore of a fluidway, the angles of conicity of the respective nipple and bore being different.

Figure 10 shows still another modification in which a slightly oversized cylindrical nipple is pressed into the cylindrical bore in the fluidway of a fitting to abut against a shoulder formed therein.

Figure 11 is a view showing a cylindrical nipple screwed home into the fluidway of a fitting.

Figure 12 is a fragmentary view showing still another modification.

It will be apparent as the description proceeds that the invention is not limited to a valve or to the material thereof or its method of manufacture but is equally applicable in any situation in which a tubular section is to be secured with a fluid tight joint to any type of fitting.

Referring now to Figure 1, a valve body is indicated at 10 formed with fluidways 12. The particular form of valve gate, valve stem and bonnet illustrated form no part of the invention and will, therefore, not be discussed.

The fluidways illustrated are substantially cylindrical and are inwardly of increased diameter as shown to form a recess 14 sufficient to receive a nipple 16 and the end 18 of the pipe to be secured to the valve, so that the interior surface 20 of the pipe is substantially flush with the interior surface 22 of the fluidways and valve body.

The nipple 16 is preferably of a diameter such as to receive the pipe end 18 with a clearance 19 therebetween.

At its inner end, the nipple 16 is tapered or bevelled on its interior, as at 24, so that the metal of the valve body extends around the tapered edge, as at 26, and forms an abutment 28 against which a pipe end 18 abuts. The nipple 16, conveniently, is formed with peripheral grooves 30, 31 into which material of the valve body 10 extends to lock the two parts together. At its outer end, the nipple 16 is flared outwardly, as at 32.

In assembly, after the pipe end 18 is inserted in the nipple 16, a gasket 34, conveniently wedge shaped in cross-section, is inserted in the space between the mouth 32 of the nipple and the pipe 18. The gasket is preferably of some resilient non-metallic material, such as rubber, and may, if desired, be tipped, as at 36, with an armor of wear resistant and preferably malleable material such as a soft metal, for instance, lead.

An annular gland 38 may, if desired, be applied to the gasket to bear thereon and a follower 40 bears on the gland 38 and is drawn up tightly toward the valve body to compress the gasket 34 and wedge it into tight engagement with the opposing faces of the pipe 18 and flare 32 of the nipple.

So much of the structure as has been described may, if desired, be identical and the followers 40 at opposite ends may be drawn together by the bolts 42 extending through holes in plane portions 44 on the followers, the portions 41 intermediate the apertured plane portions 44 being depressed to provide a bearing surface for engagement with the gland 38.

Both gland 38 and the follower 40 are formed with central passages 45 and 46, respectively, for the pipe 18, of a diameter greater than the pipe to permit movement of the pipe with respect thereto and to accommodate the structure to pipe slightly out of line therewith.

If preferred, or if only one side of the valve is to be furnished with the connection of this invention, the valve body 12 (Figure 3) may be formed with lugs 48, radially slotted, as at 50, and with a remote face 52 in a transverse plane to receive the heads 54 of shorter bolts 56 by which a follower 40 on only one end may be secured and drawn up.

In the preferred construction, the fluidway is cast around the nipple 16 during the formation of the body of the valve. In Figure 4, there is shown a sand core 58 comprising the portion 60 about which the valve body 10 is formed and the portion 62 about which the fluidways 12 are cast. The outer ends of the fluidway core portions 62 are of reduced diameter, as at 64, and of constantly decreasing diameter or tapered and receive an annular core member 66 on which the nipples 16 are disposed with the inwardly bevelled inner end 24 extending inwardly beyond the annular cores 66 toward the valve body portion. Preferably, the annular core member 66 is previously packed or otherwise formed within the nipple 16, as shown, with an interior taper 65 of the same conicity as the taper on the tapered fluidway core portion 64. It may then be baked and then forced on to the fluidway core 64 until the face 63 abuts the shoulder 61 of the valve core. In this manner, the proper location of the nipples in the subsequently cast valve body is assured.

After the core portions and the nipples are so assembled, the assembly is placed in the molded cavity already formed by the pattern, the outside contours of the cavity being indicated by the dot and dash line 68 in Figure 4.

With the nipples 16 unheated or at room temperature, the metal is then poured into the mold in the usual way and flows inwardly of the beveled end 24 of the nipple 16 to form the stop portion 26, and enters the peripheral grooves 30, 31 in the sleeve. Because the tapered end 24 is relatively thin and because of the intensity of the heat of the molten metal, in pouring, there is, in ideal conditions, a fusing or knitting to some extent of the tapered end 24 of the nipple 16 with the metal of the body 12 which thus forms an integral structure at this point and which contributes to the fixing of the nipple 16 in the fluidway 12.

In addition, the enlarged end 70 defined by the neck formed by the groove 31 nearest to the apex of the tapered end, and the taper surface 24, is tightly held in by the stop portion 26 and the cast metal bead 72. In Figures 5 and 6, the grooves 83 and 91, corresponding to groove 31, are of lesser depth than adjacent grooves to afford adequate metal in the tapered end of the nipple.

Thus, in use, the sleeve 16 is firmly held in the fluidway 12 because there is either a true knitting of cast metal of the valve body with the metal of the nipple or because of the mechanical engagement of the annular beads on the valve body fitting into the grooves on the nipple or because of both.

In Figure 5, there is illustrated a modified form of the invention in which the nipple 80 is secured in the fluidway 12 of the cast valve body as before described, but is inwardly threaded, as at 82, to receive the threaded end 84 of a pipe. Here no flexibility of the joint is provided, but a fluid tight joint is afforded in a construction wherein the component elements cannot become separated, as before described. If desired, the nipple 80 may extend outwardly beyond the fluidway, as at 86, to provide additional bearing surface and threads.

The same method of securing a nipple in a cast valve body 10 may be utilized as indicated in Figure 6, where, say, the steel nipple 90 is of the same diameter as the end of the pipe 92 to which it is joined as by welding at 94.

It will be obvious that, in many circumstances, the peripheral grooves in the nipple may take any appropriate shape. In Figure 1, only two peripheral grooves 30 are shown; in Figure 5, more grooves, for instance, six peripheral grooves 81, are shown, the grooves being defined by arcs of smaller radii; while in Figure 7, V-shaped grooves, in cross-section, and twelve in number, are illustrated, the controlling factor being grooves of such shape and size that adequate material of the valve body will enter therein to firmly anchor the nipple in the fluidway to meet the operating conditions to which the fitting is subjected.

Referring now to Figure 8, a modification of the invention is there illustrated in which a nipple 100 has an exteriorly tapered surface 102 adapted to be received within the cylindrical bore 104 of the fluidway 12. In this instance, the nipple 100 is pressed or forced into the bore of the fluidway until tightly held therein.

In Figure 9, the fluidway 12 is formed with a tapered bore 106 of gradually decreasing diameter and receives a nipple 108 also having an outer tapered surface 110, the angle of conicity of the tapers 106 and 110 being different, that of the nipple 110 being at a greater angle.

In Figure 10, a slightly oversized nipple 112 of an exterior diameter slightly greater than the interior diameter of the bore 114 of the fluidway section is adapted to be pressed or forced therein into abutting relation with a shoulder 116 formed in the fluidway and thus held tightly in position.

In Figure 11, still another modification is shown in which the nipple 116 is exteriorly threaded and is threaded into the interiorly threaded fluidway 12. Preferably the threads in question will be pipe threads so that a fluid tight joint may be obtained. The nipple 116 will be screwed home until a fluid tight joint is obtained.

In the modification illustrated in Figure 12, the outer surface of the nipple 120 of denser grain is turned down throughout that portion entering the fitting 122, at spaced portions 124. These portions 124 of lesser diameter define beads 126. Inwardly, the nipple end is of increased diameter for a short distance, as at 128, and the very inner extremity is inwardly beveled, as at 130. The end is thus rabbeted.

When the nipple 120 is disposed on the core 60, as explained in connection with Figure 4, the inner end of the annular core member terminates in the transverse plane of the shoulder 129 defined by the reduced inner surface 128. The impression in the mold coincides, conveniently, with the outer end of the outer turned down portion 124. Then when the material of lesser density is poured, it flows into the grooves 124 and embeds the beads 126 therein. It also flows around the beveled end 130 and up to the shoulder 129 forming the abutment portion 132. There is particularly here a fusing or knitting of the cast metal not only with respect to the thin end 127 but also with the beads 126, thus affording an exceptionally good securing of the nipple within the fitting which, at the same time, has a certain degree of flexibility or deformation permitting deflection of the pipe end.

In every instance, in the modifications of Figures 8 through 12, the connection between the nipple and pipe end are made as hereinbefore described.

It will thus be seen that a fluid tight joint is provided between a fitting and a pipe line which affords compensation for relative movement or misalignment of the coacting parts. In the securing of the nipple in the fluidway, a method has been provided which, contrary to what might be expected, insures a tight and strong joint by fusing or knitting the parts together.

Various modifications will occur to those skilled in the art in the composition, configuration and utilization of the component elements going to make up the invention as a whole as well as in the application of the method disclosed and no limitation is intended by the phraseology of the foregoing description or illustrations in the accompanying drawings except as indicated in the appended claims.

What is claimed is:—

1. The method of manufacturing a fitting having a fluidway comprising employing a core having a fluidway section, said section being of reduced diameter to provide a shoulder and tapering from the shoulder outwardly, forming an annular core member, with an inwardly tapering bore, within a nipple having a beveled end, outwardly of the annular core member, and a plurality of circumferential grooves, forcing the annular core member with the nipple thereon, on to the tapering end of the fluidway core in abutting relation with the shoulder, disposing the core and nipples so formed in a mold, pouring molten metal into the mold about the core and about the beveled nipple end into contact with the interior surface whereby the metal of said beveled end fuses with the molten metal and enters the peripheral grooves and cooling the metal.

2. The method of manufacturing a fitting having a fluidway comprising employing a core having a fluidway section, said section tapering outwardly, forming an annular core member, with an inwardly tapering bore, within a nipple having a beveled end, outwardly of the annular core member, forcing the annular core member with the nipple thereon on to the tapering end of the fluidway, disposing the core and nipples so formed in a mold, pouring molten metal into the mold about the core and about the beveled nipple end whereby the metal of said beveled end fuses with the molten metal and cooling the metal.

WILLIAM H. LOLLEY.
HENRY B. LEE.